(12) United States Patent
Patterson

(10) Patent No.: US 7,308,599 B2
(45) Date of Patent: Dec. 11, 2007

(54) METHOD AND APPARATUS FOR DATA RECONSTRUCTION AFTER FAILURE OF A STORAGE DEVICE IN A STORAGE ARRAY

(75) Inventor: Brian Patterson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 10/457,892

(22) Filed: Jun. 9, 2003

(65) Prior Publication Data

US 2004/0250161 A1 Dec. 9, 2004

(51) Int. Cl.
G06F 11/00 (2006.01)

(52) U.S. Cl. .................................. 714/6; 711/114

(58) Field of Classification Search ............... None
See application file for complete search history.

(56) References Cited

U.S. PATENT DOCUMENTS

| | | | |
|---|---|---|---|
| 5,331,646 A * | 7/1994 | Krueger et al. ............. 714/766 |
| 5,596,709 A * | 1/1997 | Bond et al. ................... 714/7 |
| 5,666,512 A * | 9/1997 | Nelson et al. .............. 711/114 |
| 5,812,753 A | 9/1998 | Chiariotti |
| 5,923,839 A * | 7/1999 | Munetoh et al. ............. 714/48 |
| 6,154,853 A | 11/2000 | Kedem |
| 6,269,453 B1 * | 7/2001 | Krantz ........................ 714/6 |
| 6,311,251 B1 | 10/2001 | Merritt et al. |
| 6,347,359 B1 | 2/2002 | Smith et al. |
| 6,516,425 B1 | 2/2003 | Belhadj et al. |
| 6,728,833 B2 * | 4/2004 | Pruett et al. ................ 711/114 |
| 7,058,762 B2 * | 6/2006 | Patterson et al. ........... 711/114 |
| 7,155,634 B1 * | 12/2006 | Le Graverand et al. ........ 714/6 |
| 2002/0073279 A1 * | 6/2002 | Sasamoto et al. ........... 711/114 |
| 2003/0088803 A1 * | 5/2003 | Arnott et al. .................. 714/5 |
| 2003/0188101 A1 * | 10/2003 | Fore et al. .................. 711/114 |
| 2004/0250017 A1 * | 12/2004 | Patterson et al. ........... 711/114 |
| 2005/0120262 A1 * | 6/2005 | Dandrea ......................... 714/6 |

* cited by examiner

Primary Examiner—Christopher McCarthy

(57) ABSTRACT

An array of storage devices is monitored to detect failure of one of the storage devices. Upon detection of a storage device failure, parity data associated with data stored on the failed storage device is identified. Data stored on the failed storage device is reconstructed and stored on unused portions of storage devices that did not fail. The system then updates the parity data associated with the data stored on the failed storage device.

19 Claims, 7 Drawing Sheets

Fig. 4

| | Disk 1 | Disk 2 | Disk 3 | Disk 4 | Disk 5 | Disk 6 | Disk 7 | Disk 8 |
|---|---|---|---|---|---|---|---|---|
| RAID 1 STRIPE | DATA A | PARITY A | DATA B | DISK 4 FAILED | DATA C | PARITY C | DATA D | PARITY D |
| RAID 1 STRIPE | DATA E | PARITY E | DATA F | | DATA G | PARITY G | DATA H | PARITY H |
| RAID 5 STRIPE | DATA I | DATA J | DATA K | | DATA M | DATA N | DATA O | PARITY 1 |
| RAID 5 STRIPE | DATA P | DATA Q | DATA R | | DATA T | DATA U | DATA V | PARITY 2 |
| RAID 6 STRIPE | DATA W | DATA X | DATA Y | | DATA AA | DATA BB | PARITY 3 | PARITY 4 |
| RAID 6 STRIPE | DATA CC | DATA DD | DATA EE | | DATA GG | DATA HH | PARITY 5 | PARITY 6 |

| | Disk 1 | Disk 2 | Disk 3 | Disk 4 | Disk 5 | Disk 6 | Disk 7 | Disk 8 |
|---|---|---|---|---|---|---|---|---|
| RAID 1 STRIPE | DATA A | PARITY A | | DISK 4 FAILED | DATA C | PARITY C | DATA D | PARITY D |
| RAID 1 STRIPE | DATA E | PARITY E | | | DATA G | PARITY G | DATA H | PARITY H |
| RAID 5 STRIPE | DATA I | DATA J | DATA K | | DATA M | DATA N | DATA O | NEW PARITY 1 |
| RAID 5 STRIPE | DATA P | DATA Q | DATA R | | DATA T | DATA U | DATA V | NEW PARITY 2 |
| RAID 6 STRIPE | DATA W | DATA X | DATA Y | | DATA AA | DATA BB | PARITY 3 | PARITY 4 |
| RAID 6 STRIPE | DATA CC | DATA DD | DATA EE | | DATA GG | DATA HH | PARITY 5 | PARITY 6 |
| RAID 1 STRIPE | DATA B | PARITY B | DATA F | | PARITY F | | | |
| RAID 5 STRIPE | DATA L | DATA S | | | | | | PARITY 7 |

METHOD AND APPARATUS FOR DATA RECONSTRUCTION AFTER FAILURE OF A STORAGE DEVICE IN A STORAGE ARRAY

TECHNICAL FIELD

The systems and methods discussed herein relate to the reconstruction of data in a storage mechanism having multiple storage devices.

BACKGROUND

Various storage mechanisms are available that use multiple storage devices to provide data storage with improved performance and reliability than an individual storage device. For example, a Redundant Array of Independent Disks (RAID) system includes multiple disks that store data. RAID systems and other storage mechanisms using multiple storage devices provide improved reliability by using parity data. Parity data allows a system to reconstruct lost data if one of the storage devices fails or is disconnected from the storage mechanism.

Several techniques are available that permit the reconstruction of lost data. One technique reserves one or more storage devices in the storage mechanism for future use if one of the active storage devices fails. The reserved storage devices remain idle and are not used for data storage unless one of the active storage devices fails. If an active storage device fails, the missing data from the failed device is reconstructed onto one of the reserved storage devices. A disadvantage of this technique is that one or more storage devices are unused unless there is a failure of an active storage device. Thus, the overall performance of the storage device is reduced because available resources (the reserved storage devices) are not being utilized. Further, if one of the reserved storage devices fails, the failure may not be detected until one of the active storage devices fails and the reserved storage device is needed.

Another technique for reconstructing lost data uses all storage devices to store data, but reserves a specific amount of space on each storage device in case one of the storage devices fail. Using this technique, the storage mechanism realizes improved performance by utilizing all of the storage devices while maintaining space for the reconstruction of data if a storage device fails. In this type of storage mechanism, data is typically striped across the storage devices. This data striping process spreads data over multiple storage devices to improve performance of the storage mechanism. The data striping process is used in conjunction with other methods (e.g., parity data) to provide fault tolerance and/or error checking. The parity data provides a logical connection that relates the data spread across the multiple storage devices.

A problem with the above technique arises from the logical manner in which data is striped across the storage devices. To reconstruct data from a failed storage device and store that data in the unused space on the remaining storage devices, the storage mechanism relocates all of the data on all of the storage devices (i.e., not just the data from the failed storage device). Relocation of all data in a data stripe is time consuming and uses a significant amount of processing resources. Additionally, input/output requests by host equipment coupled to the storage mechanism are typically delayed during this relocation of data, which is disruptive to the normal operation of the host equipment.

Accordingly, there is a need for an improved system and method to reconstruct data in a storage mechanism that contains multiple storage devices.

SUMMARY

The systems and methods described herein reduce the amount of data relocated when a storage device fails. Rather than relocating an entire data stripe (or other group of data that spans multiple storage devices), the portion of the data stripe on the failed storage device is relocated while the remaining portions of the data stripe are maintained in their existing locations.

In one embodiment, an array of storage devices is monitored for failure of a storage device. Upon failure of a storage device, parity data associated with the failed storage device is identified. Data stored on the failed storage device is reconstructed and stored on unused portions of storage devices that did not fail. Finally, parity data associated with the data stored on the failed storage device is updated.

BRIEF DESCRIPTION OF THE DRAWINGS

The present invention is illustrated by way of example and not limitation in the figures of the accompanying drawings. These figures merely represent one or more possible embodiments of the invention. Similar reference numbers are used throughout the figures to reference like components and/or features.

FIG. 4 illustrates the data and parity information of FIG. 3 after a disk failure occurs.

FIG. 5 illustrates the data and parity information of FIG. 4 after reconstructing the RAID 1 and RAID 5 stripes.

DETAILED DESCRIPTION

The systems and methods described herein reconstruct data after a storage device failure in a storage system containing multiple storage devices. Rather than provide one or more unused storage devices in case of a failure, the storage system reserves storage space on the multiple storage devices. When a failure occurs, the system reconstructs and stores the data from the failed storage device using the reserved storage space. The reconstruction and storage of data is improved because data from the failed storage device is reconstructed and stored, while data remaining on the active storage devices (i.e., the storage devices not affected by the device failure) is not changed. If necessary, parity information associated with the reconstructed data and/or data stripe is updated. Parity information may also be referred to as "parity data".

Particular examples described herein discuss storage systems that utilize multiple disks and various RAID techniques. However, the systems and methods discussed herein can be applied to any type of storage device and any data storage technique. For example, storage devices may include disks, memory devices, or any other data storage mechanism. Further, any type of parity and/or data striping techniques can be utilized with the systems and methods discussed herein.

Figure 1:
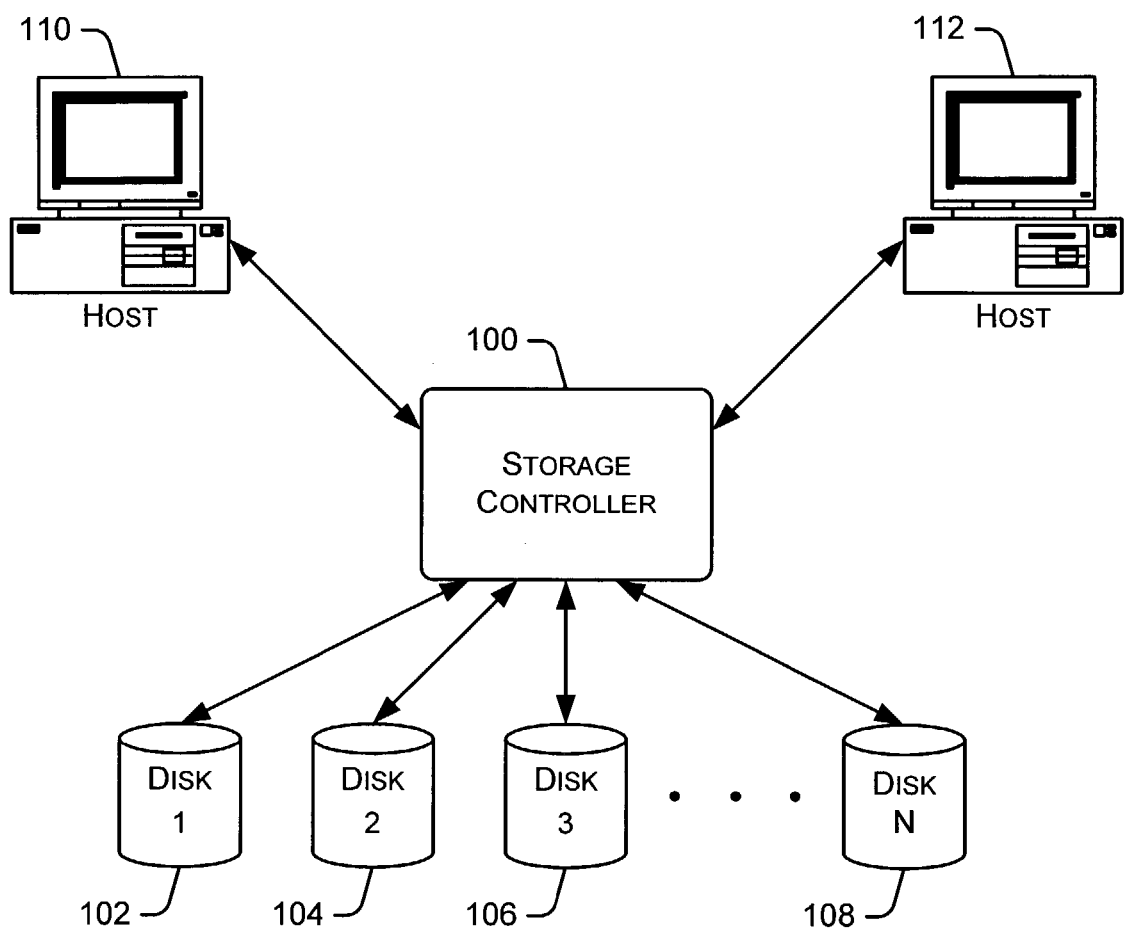
FIG. 1 illustrates an exemplary environment in which a storage controller manages various data storage and retrieval operations.

FIG. 1 illustrates an exemplary environment in which a storage controller 100 manages various data storage and retrieval operations. Storage controller 100 receives data read requests and data write requests from one or more hosts 110 and 112. A host may be any type of computer, such as a workstation, a laptop computer, a handheld computer, or a server. Alternatively, a host may be any other type of computing device. Although FIG. 1 illustrates two hosts 110 and 112, a particular storage controller 100 may be coupled to any number of hosts.

Storage controller 100 is also coupled to multiple disks 102, 104, 106 and 108. A particular storage controller can be coupled to any number of disks or other storage devices. As discussed herein, storage controller 100 handles the storage and retrieval of data on the multiple disks 102-108. In a particular embodiment, storage controller 100 is capable of implementing various types of RAID (Redundant Array of Independent Disks) technology. Alternatively, storage controller may implement other technologies or procedures that allow data to be reconstructed after a storage device fails. Storage controller 100 may be a separate device or may be part of a computer system, such as a server. Additionally, disks 102-108 may be located in the same device as storage controller 100 or in a separate device coupled to storage controller 100. In one embodiment, disks 102-108 have approximately equal storage capacities.

Figure 2:
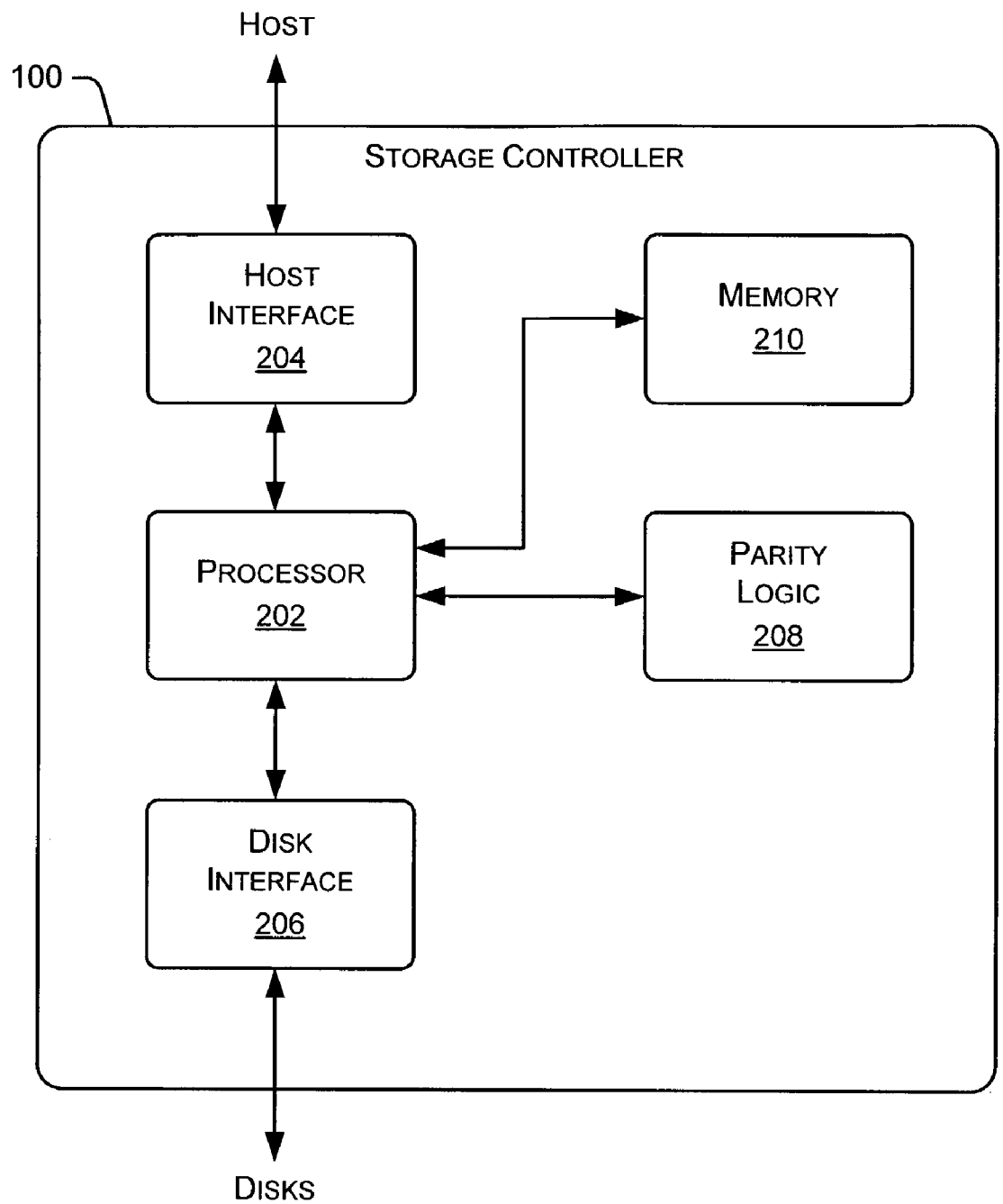
FIG. 2 is a block diagram of an exemplary storage controller capable of implementing the procedures discussed herein.

FIG. 2 is a block diagram of storage controller 100, which is capable of implementing the procedures discussed herein. A processor 202 performs various operations and tasks necessary to manage the various data storage and data retrieval requests received from hosts 110 and 112 (FIG. 1). Additionally, processor 202 performs various functions to reconstruct lost data as a result of a storage device failure, as described herein.

Processor 202 is coupled to a host interface 204, which provides a bidirectional data communication interface to one or more hosts. Processor 202 is also coupled to a disk interface 206, which provides a bidirectional data communication interface to multiple disks or other storage devices. Parity logic 208 is coupled to processor 202 and provides processor 202 with the logic necessary to generate parity information and reconstruct lost data based on parity information. Parity logic 208 may include multiple types of parity logic depending on the types of parity supported by storage controller 100. Parity logic 208 may also include information regarding different RAID levels that are supported by storage controller 100. Memory 210 is also coupled to processor 202 and stores various information used by processor 202 when carrying out its tasks. Memory 210 may include volatile memory, non-volatile memory, or a combination of volatile and non-volatile memory.

The embodiment of FIG. 2 represents one possible configuration of storage controller 100. It will be appreciated that various other storage controller configurations can be used to implement the procedures discussed herein.

As mentioned above, in a particular embodiment, storage controller 100 is capable of implementing RAID technology. RAID systems use multiple storage devices (e.g., disks) in combination with parity data to improve reliability and fault tolerance. A summary of several different RAID levels is provided below. RAID level 0 (also referred to as RAID 0) provides data striping across multiple disks, but no redundancy. Data is broken into blocks and each block is written to a separate disk. Parity information is not used in RAID 0 systems. RAID level 1 (also referred to as RAID 1) provides disk mirroring. Disk mirroring is a technique in which data is written to two duplicate disks simultaneously. The duplicate copy of the data may be referred to as the parity data in RAID 1 systems.

RAID level 3 (also referred to as RAID 3) is similar to RAID 0, but also reserves one dedicated disk (referred to as the parity disk) for error correction data. A data block is striped across the multiple disks and parity information is stored on the parity disk. RAID level 5 (also referred to as RAID 5) provides data striping at the byte level and parity information. Each data block is written to a disk and parity information for each data stripe is stored on one of the disks. RAID level 6 (also referred to as RAID 6) is similar to RAID 5, but uses two separate parity schemes for enhanced fault tolerance. The above summary discusses a few particular RAID levels, but does not represent an exhaustive list of all RAID levels.

Figure 3:
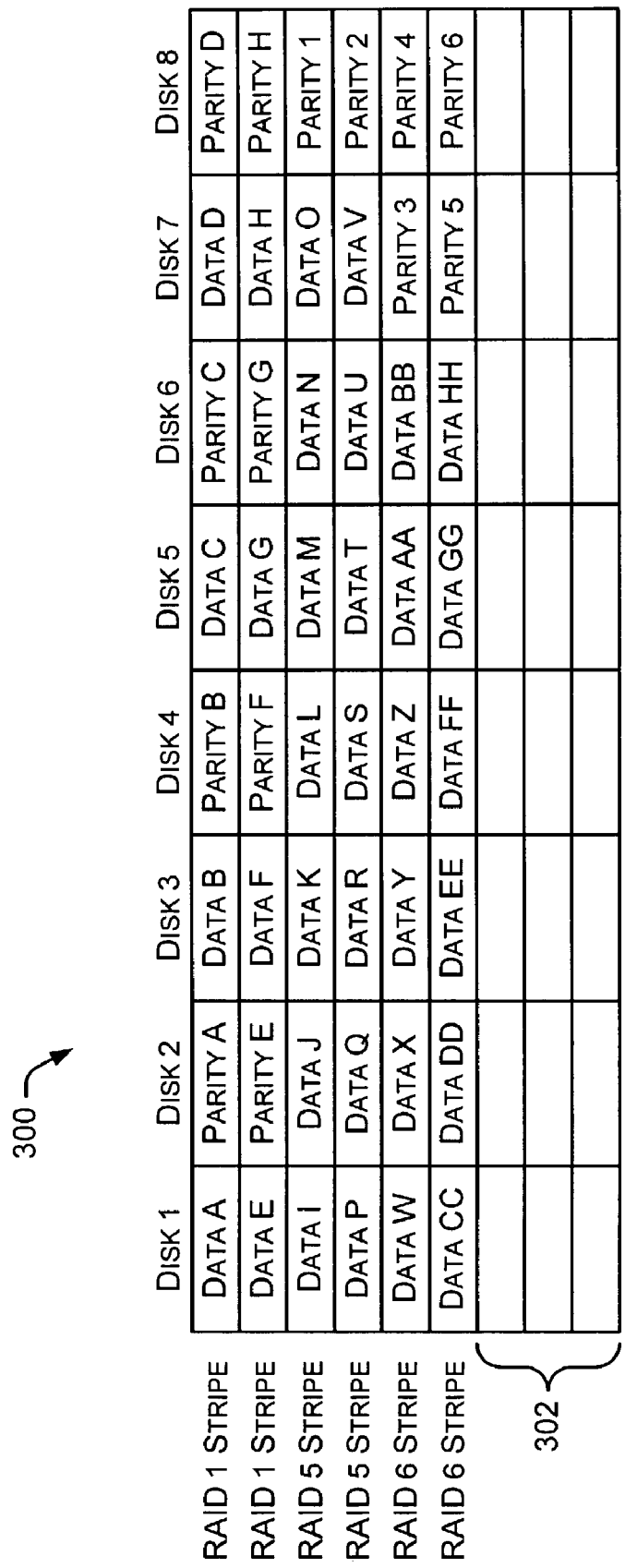
FIG. 3 illustrates an exemplary arrangement of data and parity information stored on eight disks using various RAID techniques.

FIG. 3 illustrates an exemplary arrangement 300 of data and parity information stored on an array of eight disks using various RAID techniques. The storage capacity of each disk (labeled Disk 1 through Disk 8) in FIG. 3 is represented by a column. Although six data stripes are shown in FIG. 3, a typical storage mechanism may contain any number of data stripes. The first two rows in FIG. 3 represent RAID 1 stripes, the next two rows represent RAID 5 stripes and the next two rows represent RAID 6 stripes. The last three rows, identified by reference number 302, represent unused storage space on each disk. This unused storage space is available for reconstruction of data and/or parity information if one or more of the disks fail.

In the RAID 1 stripes, the parity information is a copy of the data. For example, Parity A data on disk 2 is a copy of Data A stored on disk 1. Similarly, Parity B data on disk 4 is a copy of Data B stored on disk 3. A RAID 1 stripe may include, for example, two disks (the disk storing the data and the disk storing the parity data).

In the RAID 5 stripes, data is stored on the first seven disks (e.g., Data I-Data O and Data P-Data V) and parity data is stored on disk 8. In the example of FIG. 3, "Parity 1" data is associated with Data I-Data O and "Parity 2" data is associated with Data P-Data V. Thus, Parity 1 data is used to reconstruct any of data elements Data I-Data O, and Parity 2 data is used to reconstruct any of data elements Data P-Data V.

In the RAID 6 stripes, data is stored on the first six disks and parity data is stored on disk 7 and disk 8. For example, "Parity 3" data and "Parity 4" data are associated with Data W-Data BB. Similarly, "Parity 5" data and "Parity 6" data are associated with Data CC-Data HH. Each of the two parity data elements associated with the same data stripe are calculated using different techniques, although they are associated with the same data elements. Thus, either Parity 3 or Parity 4 data is used to reconstruct any of data elements Data W-Data BB. Similarly, either Parity 5 or Parity 6 data is used to reconstruct any of data elements Data CC-Data HH.

FIG. 4 illustrates the data and parity information of FIG. 3 after a disk failure occurs. In this example, disk 4 failed or is no longer accessible by the storage controller. As used herein, "failure" of a storage device refers to the situation in which the storage controller cannot access data stored on the storage device. For example, a "failure" may be the result of a failed storage device, removal or disconnection of a storage device, or failure of another component or system necessary to communicate with the storage device.

The data formerly stored on disk 4 is represented as a blank column 402. As a result of the failure of disk 4, Parity B and Parity F in the RAID 1 stripes are no longer available. Additionally, Data L and Data S in the RAID 5 stripes, and Data Z and Data FF in the RAID 6 stripes are no longer available. After the failure of disk 4, the array of disks is in need of data reconstruction.

Instead of reconstructing all data in every data stripe, the procedures described herein reconstruct the lost data and modify the associated parity data accordingly. This technique may result in the creation of one or more new data stripes containing the reconstructed data. This technique may result in improved performance by reducing relocation of data without requiring an unused spare disk.

In the example of FIG. 4, each data stripe is affected by the failure of disk 4. Thus, each data stripe will have at least one data element needing reconstruction. In a storage mechanism using different RAID techniques, it is desirable to determine an order in which the lost data is reconstructed. In one embodiment, lost data is reconstructed based on the order in which the data is stored. In the example of FIG. 4, the lost data would be reconstructed starting with the lost data in the first row, followed by the data in the second row, etc.

In another embodiment, lost data is reconstructed based on the inherent reliability of the RAID type associated with the lost data. In the example of FIG. 4, data is stored using RAID 1, RAID 5 and RAID 6 techniques. Among these three RAID types, RAID 6 has the highest reliability, RAID 1 has the next highest reliability and RAID 5 has the lowest reliability. RAID 6 has the highest reliability due to the use of two different parity techniques. The RAID 6 data can handle failure of any additional disk in the array without losing the ability to reconstruct all of the data in the RAID 6 stripes.

RAID 1 has the next highest reliability because it can handle failure of any additional disk in the array except disk 3 without losing the ability to reconstruct all of the data in the RAID 1 stripes. Disk 3 contains the only copy of Data B and Data F because the parity copy was lost with the failure of disk 4. Thus, failure of disk 3 would result in a permanent loss of Data B and Data F. Due to the disk mirroring of RAID 1, any other disk failure will not result in loss of data.

RAID 5 has the lowest reliability because RAID 5 supports a single disk failure. If a second disk fails before the data from the first disk is reconstructed, the data in the RAID 5 stripes cannot be fully reconstructed. Thus, the reliability of RAID 5 stripes are at the greatest risk in the example of FIG. 4 because any additional disk failure will result in a loss of data. Thus, in one embodiment, the data in the example of FIG. 4 is reconstructed in the following order: RAID 5 stripes, RAID 1 stripes, RAID 6 stripes.

For purposes of the example data shown in FIG. 4, the data reconstruction will be discussed in the order that the data is stored in the array (i.e., RAID 1 stripes, RAID 5 stripes, RAID 6 stripes). Similar procedures are used to reconstruct the data regardless of the order used during the data reconstruction.

FIG. 5 illustrates the data and parity information of FIG. 4 after reconstructing the RAID 1 and RAID 5 stripes. As shown in FIG. 5, a new RAID 1 stripe has been added that contains data from the two RAID 1 stripes that were affected by the failure of disk 4. Additionally, a new RAID 5 stripe has been added that contains the data from the two RAID 5 stripes that were affected by the failure of disk 4.

The new RAID 1 stripe contains Data B (block 502) and Parity B (block 504) from the first RAID 1 stripe and Data F (block 506) and Parity F (block 508) from the second RAID 1 stripe. Thus, the original data (Data B and Data F) and the corresponding parity data (Parity B and Parity F) have been reconstructed, but the other data in the RAID 1 stripes is unchanged. The previous versions of Data B on disk 3 (first data stripe) and Data F on disk 3 (second data stripe) have been deleted (or deallocated) to allow other data to be stored in those locations.

The new RAID 5 stripe contains Data L (block 510) from the first RAID 5 stripe (the third row in FIG. 4) and Data S (block 512) from the second RAID 5 stripe (the fourth row in FIG. 4). The new RAID 5 stripe also contains Parity 7 (block 514) stored on disk 8 along with the other RAID 5 parity information. Since data has been deleted from the original RAID 5 stripes due to the failure of disk 4, the parity information (Parity 1 and Parity 2) associated with those data stripes needs to be updated, as indicated by "New Parity 1" and "New Parity 2". The New Parity 1 value is determined by recalculating the parity value of Parity 1 without Data L. Similarly, the New Parity 2 value is determined by recalculating the parity value of Parity 2 without Data S. Recalculation of the parity values is performed according to the mathematical equation associated with the RAID 5 technique.

Figure 6:
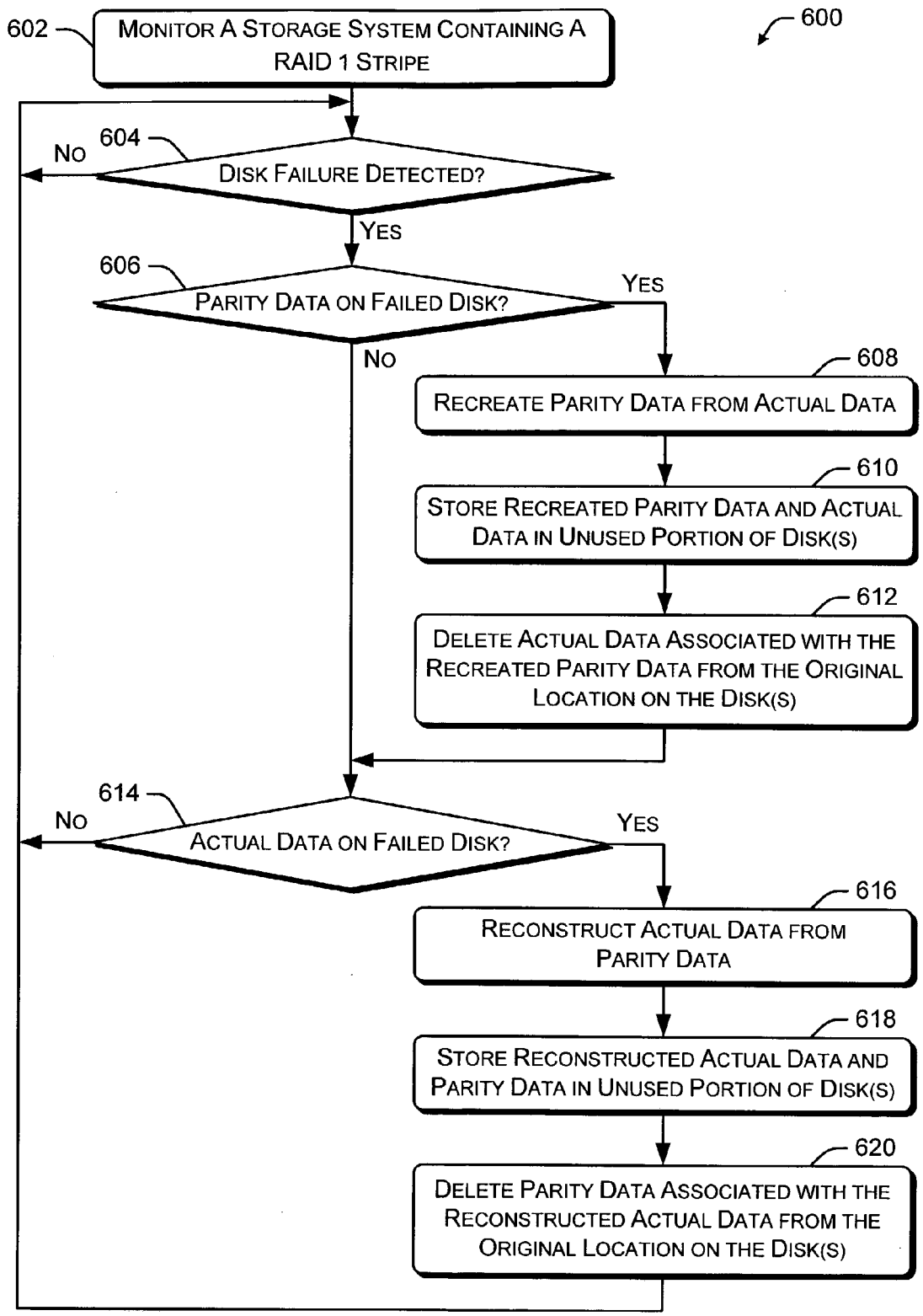
FIG. 6 is a flow diagram illustrating an embodiment of a procedure for reconstructing data stored in a RAID 1 stripe.

FIG. 6 is a flow diagram illustrating an embodiment of a procedure 600 for reconstructing data stored in a RAID 1 stripe. The procedure 600 monitors a storage system containing at least one RAID 1 stripe (block 602). The procedure monitors the storage system for a disk failure (block 604). If a disk failure is detected, the procedure determines whether any RAID 1 parity data was stored on the failed disk (block 606). If the failed disk contained RAID 1 parity data, the parity data is recreated from the actual data on the remaining disks (block 608). The recreated parity data and the associated data (i.e., the actual data) is stored in an unused portion of one or more disks (block 610). The procedure then deletes the actual data associated with the recreated parity data from the original location (block 612). The remaining parity data and the actual data that was not affected by the failed disk is not changed.

Procedure 600 continues by determining whether the failed disk contained RAID 1 data (block 614). If so, the data is reconstructed from the associated parity data (block 616). The reconstructed data and the associated parity data is then stored in an unused portion of one or more disks (block 618). The procedure then deletes the parity data associated with the reconstructed data from the original location (block 620). The procedure returns to block 604 to continue monitoring the storage system for a disk failure.

Figure 7:
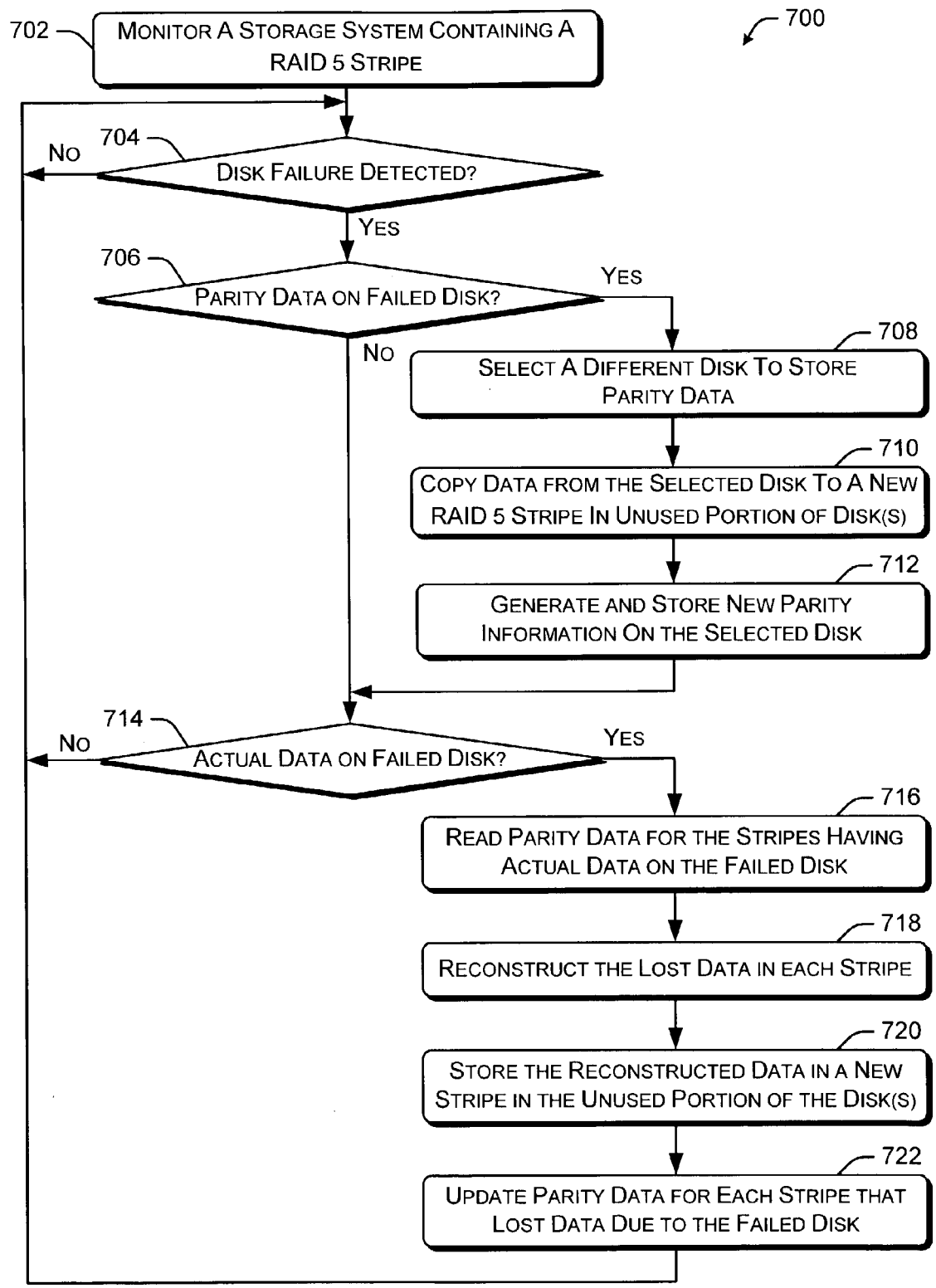
FIG. 7 is a flow diagram illustrating an embodiment of a procedure for reconstructing data stored in a RAID 5 stripe.

FIG. 7 is a flow diagram illustrating an embodiment of a procedure 700 for reconstructing data stored in a RAID 5 stripe. The procedure 700 monitors a storage system containing one or more RAID 5 stripes (block 702). The procedure monitors the storage system for a disk failure (block 704). If a disk failure is detected, the procedure determines whether any RAID 5 parity data was stored on the failed disk (block 706). If so, the procedure selects a different disk to store parity data (block 708). Data from the selected disk is then copied to a new RAID 5 stripe in the unused portion of the disks (block 710). This copying of data is necessary because the selected disk is now used for storing RAID 5 parity information. Thus, the RAID 5 stripe data formerly stored on the selected disk needs to be relocated to allow for storage of the parity information. The procedure then generates and stores new parity information on the selected disk (block 712). The new parity information is generated for the previous data stripes (that now have one less data element in each stripe) and for the data elements copied from the selected disk.

In the example of FIG. 3, if disk 8 fails, the two RAID 5 stripes do not have any parity information. Also, due to the loss of disk 8, each stripe length will be no greater than seven disks. Each RAID 5 stripe in FIG. 3 already has seven data elements. Thus, if disk 7 is designated as the new parity disk for RAID 5 stripes, the data elements in the RAID 5 stripes stored on disk 7 need to be moved (i.e., copied) into a new RAID 5 data stripe. After those data elements are moved, new parity information is calculated for the two existing RAID 5 stripes (each containing six data elements: Data I-Data N and Data P-Data U) and the new RAID 5 stripe containing Data O and Data V moved from disk 7.

Referring back to FIG. 7, procedure 700 continues by determining whether the failed disk contained any RAID 5 data (block 714). If so, the procedure reads parity data associated with the RAID 5 stripes having data on the failed disk (block 716). The lost data in each RAID 5 stripe is then reconstructed using the associated parity data (block 718). The reconstructed data is stored in a new data stripe in an unused portion of one or more disks (block 720). The procedure then updates the parity data for each RAID 5 stripe in which data was lost due to the disk failure (block 722).

The procedures of FIGS. 6 and 7 were used to implement the changes shown in FIG. 5 as a result of the failure of disk 4.

The embodiments discussed above with respect to FIGS. 6 and 7 illustrate example procedures in which parity data on a failed disk is handled first, followed by handling actual data on the failed disk. In another embodiment, after a disk fails, procedures first handle reconstruction of the actual data, followed by the recreation of parity data. In yet another embodiment, after failure of a disk, parity data and actual data is handled on a stripe-by-stripe basis. For example, after the disk failure, the procedure would identify a first stripe of a particular RAID type being handled. If the identified stripe was missing a parity disk, the procedure would recreate or the parity data. If the identified stripe was missing actual data, the procedure would reconstruct the missing data. The procedure then identifies the next stripe of the particular RAID type and repeats the handling of parity data and actual data. After all stripes for the particular RAID type have been processed, the procedure continues with other RAID types until all stripes needing repair of parity data or actual data have been processed.

Figure 8:
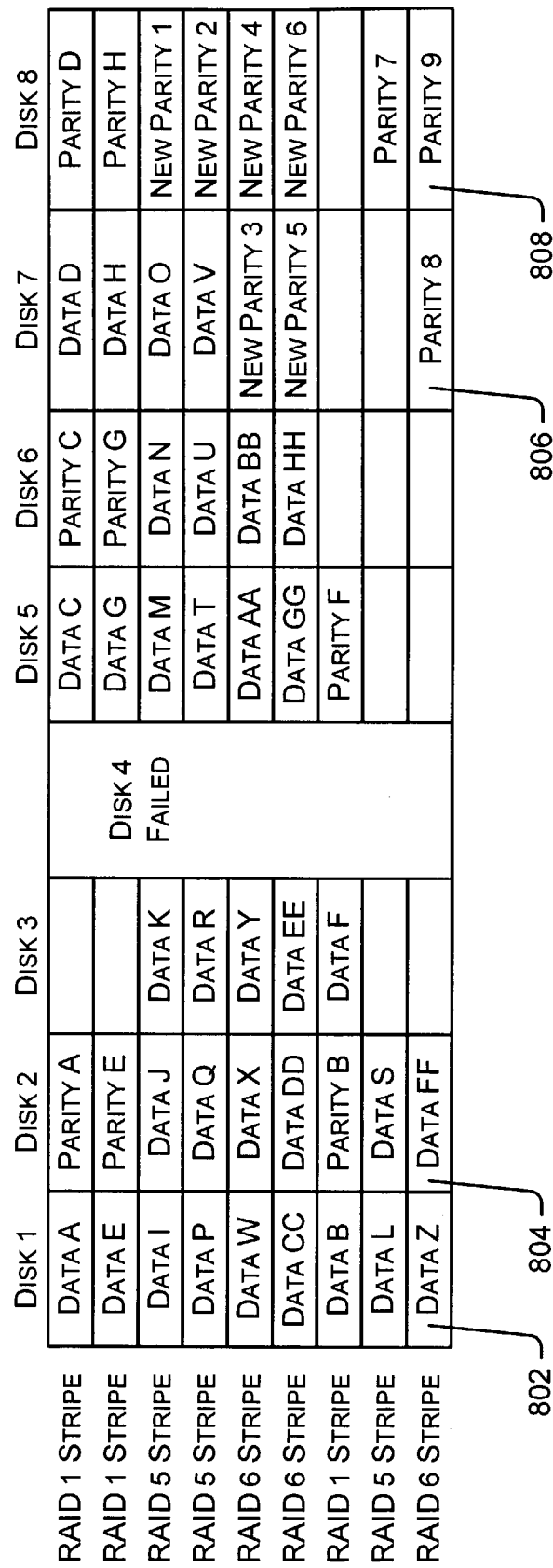
FIG. 8 illustrates the data and parity information of FIG. 4 after reconstructing the RAID 1, RAID 5 and RAID 6 stripes.

FIG. 8 illustrates the data and parity information of FIG. 4 after reconstructing the RAID 1, RAID 5 and RAID 6 stripes. Reconstruction of a RAID 6 stripe is similar to the procedure for the RAID 5 stripes except that there are two parity values for each RAID 6 stripe. Thus, all of the data and parity information is read for each RAID 6 stripe to reconstruct the lost data due to the failure of disk 4. The reconstructed data is stored in a new RAID 6 stripe as Data Z (block 802) and Data FF (block 804). The previous parity data (Parity 3 and Parity 4 for Data Z, Parity 5 and Parity 6 for Data FF) is updated based on the data lost from the data stripe. Parity 3 and Parity 4 are recalculated without Data Z, and Parity 5 and Parity 6 are recalculated without Data FF. Recalculation of these parity values is performed according to the mathematical equation associated with the RAID 6 technique.

Additionally, new parities (Parity 8 and Parity 9) are calculated based on the new RAID 6 stripe that contains Data Z and Data FF. Parity 8 is stored on disk 7 (block 806) and Parity 9 is stored on disk 8 (block 808).

As shown in FIG. 8, all of the missing data has been reconstructed and the storage array is back to a normal operating state. In embodiments that that include RAID 2, RAID 3 or RAID 4 stripes, those stripes would have their data reconstructed in a manner similar to RAID 5 and RAID 6.

The systems and methods discussed herein are applicable to any storage mechanism using multiple storage devices. Further, these systems and methods can be applied to any type of storage device (or memory device) and any data recovery technique.

Although the description above uses language that is specific to structural features and/or methodological acts, it is to be understood that the method and apparatus for data reconstruction defined in the appended claims is not limited to the specific features or acts described. Rather, the specific features and acts are disclosed as exemplary forms of implementing the systems and methods described herein.

The invention claimed is:

1. A method comprising:
   monitoring an array of storage devices that use two different RAID (redundant array of independent disks) levels;
   upon detecting a failure of a storage device:
   identifying parity data associate with data stored on the failed storage device;
   reconstructing data stored on the failed storage device based on an order in which the data is stored on the failed storage device and based on the RAID level associated with lost data;
   storing the reconstructed data on unused portions of storage devices that did not fail without relocating data on the storage devices that did not fail;
   updating the parity data associated with the data stored on the failed storage device; and
   deleting the parity data if data associated with the parity data is stored on the failed storage device.

2. A method as recited in claim 1, wherein all storage devices are available to store data.

3. A method as recited in claim 1, wherein data is stored on the storage devices using data stripes written across at least two storage devices.

4. A method as recited in claim 1, further comprising:
   creating new parity data associated with the reconstructed data; and
   storing the new parity data on unused portions of the storage devices that did not fail.

5. A method as recited in claim 1, further comprising maintaining data unaffected by the storage device failure in an existing storage location for the data.

6. A method as recited in claim 1, further comprising storing the updated parity data on an unused portion of a storage device that did not fail.

7. A method comprising:
   monitoring an array of storage devices;
   upon detecting a failure of a storage device:
   identifying parity data associated with data stored on the failed storage device;
   reconstructing data stored on the failed storage device;

storing the reconstructed data on unused portions of storage devices that did not fail; and updating the parity data associated with the data stored on the failed storage device; and deleting the parity data if all data associated with the parity data is stored on the failed storage device.

8. A method comprising:

identifying data stripes containing data stored on a failed storage device in a storage array;

reading data associated with the identified data stripes;

reading parity information associated with the identified data stripes;

reconstructing data from the failed storage device based on data and parity information associated with the identified data stripes;

creating parity information associated with the reconstructed data;

storing the reconstructed data and the associated parity information in a new data stripe in the storage array without relocating data in data stripes of storage devices that did not fail; and deleting parity data if data associated with the parity data is stored on the failed storage device.

9. A method as recited in claim 8, further comprising updating parity information associated with the identified data stripes, wherein the parity information is updated to remove data in the identified data stripes that was stored on the failed storage device.

10. A method as recited in claim 8, wherein each data stripe is stored across a plurality of storage devices.

11. A method as recited in claim 8, wherein the storage array is a redundant array of independent disks.

12. A method as recited in claim 8, further comprising maintaining data in each data stripe in its existing storage location if the data is not stored on the failed storage device.

13. A method as recited in claim 8, further comprising allocating a portion of at least one storage device in the storage array to store reconstructed data and associated parity information.

14. A method as recited in claim 8, further comprising allocating a portion of each storage device in the storage array to store reconstructed data and associated parity information.

15. A method as recited in claim 8, wherein all storage devices in the storage array are available to store data.

16. An apparatus comprising:

a disk interface coupled to a plurality of storage disks;

parity logic; and a processor coupled to the disk interface and the parity logic, wherein the processor is configured to identify parity information associated with data stored on a failed storage disk and reconstruct data stored on the failed storage disk based on the parity information and parity logic, the processor further configured to store the reconstructed data on unused portions of storage devices that did not fail, maintain data in its existing storage location of the storage devices that did not fail if the data is not stored on the failed storage disk, and delete parity data if data associated with the parity data is stored on the failed storage disk.

17. An apparatus as recited in claim 16, wherein the processor is further configured to update the parity information associated with the data stored on the failed storage disk.

18. An apparatus as recited in claim 16, wherein the processor is further configured to store data on all of the plurality of storage disks.

19. An apparatus as recited in claim 16, wherein the processor is further configured to create parity information associated with the reconstructed data and store the parity information associated with the reconstructed data on unused portions of storage devices that did not fail.

* * * * *

UNITED STATES PATENT AND TRADEMARK OFFICE
CERTIFICATE OF CORRECTION

| | |
|---|---|
| PATENT NO. | : 7,308,599 B2 |
| APPLICATION NO. | : 10/457892 |
| DATED | : December 11, 2007 |
| INVENTOR(S) | : Brian Patterson |

It is certified that error appears in the above-identified patent and that said Letters Patent is hereby corrected as shown below:

In column 8, line 32, in Claim 1, delete "associate" and insert -- associated --, therefor.

Signed and Sealed this

Eighth Day of July, 2008

JON W. DUDAS
*Director of the United States Patent and Trademark Office*